United States Patent [19]

McWethy

[11] Patent Number: 5,725,229
[45] Date of Patent: Mar. 10, 1998

[54] TOW HITCH APPARATUS

[76] Inventor: Wesley L. McWethy, 1621 Hiawatha Ave., Stockton, Calif. 95205

[21] Appl. No.: 705,590

[22] Filed: Aug. 29, 1996

[51] Int. Cl.$^6$ ........................................... B60D 1/06
[52] U.S. Cl. ........................... 280/416.1; 280/491.5
[58] Field of Search ........................ 280/415.1, 416.1, 280/416.3, 456.1, 490.1, 491.1, 491.5, 495, 504, 508, 511, 515

[56] References Cited

U.S. PATENT DOCUMENTS

| | | | |
|---|---|---|---|
| 2,700,555 | 1/1955 | Arend | 280/504 |
| 2,827,307 | 3/1958 | Osborn | 280/416.3 |
| 3,717,362 | 2/1973 | Johnson | 280/416.1 |
| 3,801,134 | 4/1974 | Dees. | |
| 3,922,006 | 11/1975 | Borges | 280/416.1 |
| 4,248,450 | 2/1981 | McWethy. | |
| 4,280,713 | 7/1981 | Bruhn | 280/490.1 X |
| 4,697,818 | 10/1987 | Moore. | |
| 4,729,571 | 3/1988 | Tienstra. | |
| 5,106,114 | 4/1992 | Haupt | 280/416.1 |
| 5,265,899 | 11/1993 | Harrison. | |
| 5,351,982 | 10/1994 | Walrath. | |
| 5,560,630 | 10/1996 | Phares et al. | |

FOREIGN PATENT DOCUMENTS

| | | | |
|---|---|---|---|
| 976578 | 10/1975 | Canada | 280/490.1 |
| 36 39 183 A1 | 8/1987 | Germany. | |

*Primary Examiner*—Kevin Hurley
*Attorney, Agent, or Firm*—John P. O'Banion

[57] ABSTRACT

A trailer hitch apparatus having a shank with a plurality of different sized tow balls mounted thereon, and at least one form of hitch hardware other than a tow ball. A tongue joined to the shank is received by a matching receiver on a towing vehicle, and secured therein by a pin. By suitably orienting the shank prior to engaging the tongue in the receiver, the tow ball of chosen size or the non-tow ball hitch is positioned to mate with a corresponding coupler on a trailer vehicle. In a first embodiment of the invention, a pintle and latch assembly are included on the shank. In a second embodiment of the invention, a vertical bar with a sleeve member slidably mounted thereon allows the shank to be positioned vertically. In a third embodiment of the apparatus a U-shaped hitch member is provided on the shank for coupling to a wagon tongue. In a fourth embodiment of the invention, a towing hook is included on the shank.

12 Claims, 9 Drawing Sheets

FIG. — 1

TOW HITCH APPARATUS

BACKGROUND OF THE INVENTION

1. Field of the Invention

This invention pertains generally to devices and methods for towing a trailer behind a vehicle, and more particularly to a universal tow hitch apparatus which may be used with a variety of towing assemblies.

2. Description of the Background Art

Tow hitch assemblies are commonly used for the towing of one vehicle by another. Such an assembly generally comprises a tow ball secured on the rear of the towing vehicle and a coupler or receiver for the tow ball which is attached to the trailer or towed vehicle. A problem which nearly always arises with this standard tow hitch arrangement is that it is desirable to tow different trailers behind the same vehicle, and different trailer vehicles frequently have couplers which differ in structure and configuration and which do not fit or mate with the tow ball attached to the towing vehicle. In order to tow a trailer with a non-matching coupler, the tow ball must be removed and replaced with a different tow ball, which causes delay and inconvenience. Similarly, many trailer vehicles are equipped to be towed with a towing ring, tractor or wagon-hitch or like arrangement which cannot receive a tow ball, thus requiring exchange of the tow ball on the towing vehicle with the correct towing hardware.

A variety of tow hitch devices have been developed which provide multiple tow balls that are exchanged or re-positioned on the tow hitch device in order to accommodate multiple coupler configurations. The previously known multiple tow ball devices have proved deficient, however, in that mechanical strength is sacrificed to provide the interchangeable tow balls, and the reduced strength leads to failure of the tow hitch during towing, resulting in damage to or loss of the towed vehicle and creating road hazards. The previously known multiple tow ball devices are also deficient in that, while they include multiple tow balls, they generally fail to provide hardware for towing vehicles which do not have tow ball couplers but, instead, have a trailer ring, wagon tongue or other type of coupler. The multiple tow ball device must be removed and exchanged with suitable hardware to tow such vehicles. A further deficiency in presently available multiple tow ball devices is that many such devices rely on interchangeable tow balls which must be stored, typically within the towing vehicle, when not in use. The free tow balls can be misplaced or lost during such storage, and tend to "rattle" around or generate noise during travel due to vibration when stored in a vehicle, and are otherwise inconvenient to use. Yet another problem experienced with conventional tow hitch assemblies is that the tow ball on the towing vehicle may be located such that it is not in proper vertical alignment with the coupler on the towed vehicle. Incorrect or non-optimum vertical alignment of the tow ball and coupler can result in unequal load sharing on the different axles of multi-axle vehicles, may result in poor shock absorption, and can result in damage to or failure of the tow hitch assembly.

Accordingly, there is a need for a tow hitch apparatus which provides multiple tow balls which can be quickly and easily repositioned for towing trailer vehicles with different sized couplers, which provides hardware for coupling to towing rings, tractor hitches and other tow hitch hardware, which provides a high level of strength and will not fail during towing, and in which the individual tow balls and other hardware are integral to the apparatus and cannot be lost during storage. The present invention satisfies those needs, as well as others, and generally overcomes the deficiencies found in the background art.

SUMMARY OF THE INVENTION

The present invention is a tow hitch apparatus which provides multiple tow balls and like coupling hardware which can be quickly and easily repositioned to allow towing of vehicles having different tow ball couplers and other, non-tow ball type hitching hardware. In general terms, the invention comprises a plurality of different sized tow balls joined to a shank, at least one non-tow ball hitch means for detachably joining or attaching the shank to a coupler on a towed vehicle, with the non-tow ball hitch means also attached to the shank, and a tongue extending from the shank which is structured and configured to be received by a corresponding receiver or socket on a towing vehicle.

In a first embodiment of the invention, the non-tow ball hitch means comprises a pintle and latch assembly for coupling to a "Lunette eye" or tow ring coupler with releasable locking means for automatically locking the latch relative to the pintle to hold a Lunette eye. In a second embodiment of the invention, means for vertically positioning the shank and tow hitch means relative to the towing vehicle and towed vehicle are provided in the form of a sleeve slidably mounted on a vertical bar which locks to the bar in chosen vertical positions by means of pins. In a third embodiment of the invention, the non-tow ball hitch means comprises an agricultural vehicle-type hitch assembly for coupling to wagon hitches or tractor hitches or couplers. In a fourth embodiment of the invention, the non-tow ball hitch means comprises a hook for coupling to a tow chain.

There exist four presently preferred embodiments of the latch assembly of the invention. In a first embodiment of the latch assembly, the releasable automatic locking means comprises a spring-loaded horizontally sliding latch pawl and a corresponding ratchet. In a second embodiment of the latch assembly, the releasable automatic locking means comprises a horizontally sliding spring-loaded latch pin and a corresponding ratchet. In a third embodiment of the latch assembly, the releasable automatic locking means comprises a pivoting, spring-loaded pivoting latch pawl and a corresponding ratchet. In a fourth embodiment of the latch assembly, the releasable automatic locking means comprises a spring-loaded rolling block pawl and a corresponding ratchet.

By way of example, and not of limitation, the shank is preferably of square cross-section and has four generally flat faces, with each tow ball or other hitch means joined to one of the faces. The tongue joined to the shank is also preferably of square cross-section, and fits into a corresponding square receiver on a receiver member and is held therein by one or more securing pins which fit through bores in the tongue and receiver. The securing pin can include a locking means to prevent unwanted removal of the pin from the bore. The shank and tongue are held by the receiver in a horizontal orientation relative to the ground. The latch assembly of the first embodiment comprises a latch member which is pivotally mounted on a latch block, and an adjacent pintle or pin which receives a towing ring attached to a trailer vehicle. The releasable automatic locking means for the latch comprises a spring loaded latch pawl which horizontally slides within the latch block and releasably engages a ratchet or tooth on the latch to hold the latch in a locking position with the pintle. The latch member is structure and configured so that when a ring coupler or Lunette eye is fitted over the pintle, the weight of the Lunette eye causes the latch member to close and automatically lock the Lunette eye onto the pintle.

In the second embodiment of the invention, the vertical positioning means preferably comprises a vertical sleeve which is joined to the receiver, and a vertical rod or bar upon which the sleeve vertically slides. A plurality of bores extend through both the vertical sleeve and vertical bar, and the sleeve is held in a desired position on the bar by inserting one or more pins through the appropriate bores.

The agricultural vehicle-type hitch assembly of the third embodiment preferably comprises a U-plate joined to the shank with a detachable, vertically mounted pin extending through bores in opposite sides of the U-plate.

The hook of the fourth embodiment of the invention preferably comprises an conventional towing hook which is suitably attached to the shank on one of the faces thereon.

In the second embodiment of the latch assembly, the releasable automatic locking means for the latch comprises a spring loaded latch pin which horizontally slides within the latch block and releasably engages the ratchet on the latch to hold the latch in a locking position with the pintle. In the third embodiment of the latch assembly, the releasable locking means for the latch comprises a spring loaded latch pawl which is pivotally mounted on the latch block and which releasably engages the ratchet on the latch to hold the latch in a locking position with the pintle. In the fourth embodiment of the latch assembly, the releasable locking means for the latch comprises a spring loaded rolling block pawl which is pivotally mounted on the latch block and which releasably engages the ratchet on the latch to hold the latch in a locking position with the pintle.

The invention is used by securing the receiver member to the rear of a towing vehicle such that an edge of the square receiver in the receiver member is horizontally oriented relative to the ground. The desired tow ball or non-tow ball hitch means is selected, and the shank is oriented so that the chosen tow ball or non-tow ball hitch means is located on the top surface of the rectangular shank. The tongue joined to the shank is then inserted into the receiver and the bores in the receiver and tongue are aligned, and the tongue is secured in the receiver by placing the securing pin through the aligned bores. The coupler or hitching member on the towed vehicle is then attached to the tow ball or non-tow ball hitch means in a standard fashion.

The multiple tow ball and non-tow ball hitch means provided on the shank allow the invention to hitch or couple to a greater variety of couplers, receivers and hitching members than has heretofore been possible with currently known tow hitch devices. The tow ball or non-tow ball hitch means can be quickly and easily re-positioned with the invention for towing different trailers, thereby avoiding the inconvenience and delay which occur with use of conventional tow hitch devices. The rectangular construction of the tongue and receiver of the invention reduce or eliminate torsional stress experienced by the securing pin during towing, thereby reducing the risk of damage or failure of the securing pin. The releasable locking means provided with the latch and pintle assembly allows quick and easy detachable coupling of trailer rings to the apparatus.

An object of the invention is to provide a tow hitch apparatus with multiple tow balls and non-tow ball hitch means for attaching to a variety of couplers and hitching members.

Another object of the invention is to provide a tow hitch apparatus which allows for quick and easy re-positioning of the multiple tow balls and non-tow ball hitch means.

Another object of the invention is to provide a tow hitch apparatus wherein the tow ball and non-tow ball hitch means may be vertically positioned.

Another object of the invention is to provide a tow hitch apparatus which allows equal load sharing per axle on multi-axle trailer vehicles.

Another object of the invention is to provide a tow hitch apparatus which is of durable construction and is not susceptible to fatigue and failure of parts.

Another object of the invention is to provide a tow hitch apparatus in which multiple tow balls and non-tow ball hitch means are integral to the apparatus and do not need to be stored separately.

Another object of the invention is to provide a tow hitch apparatus that includes a latch and pintle assembly which provides automatic locking to a Lunette eye or ring coupler.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
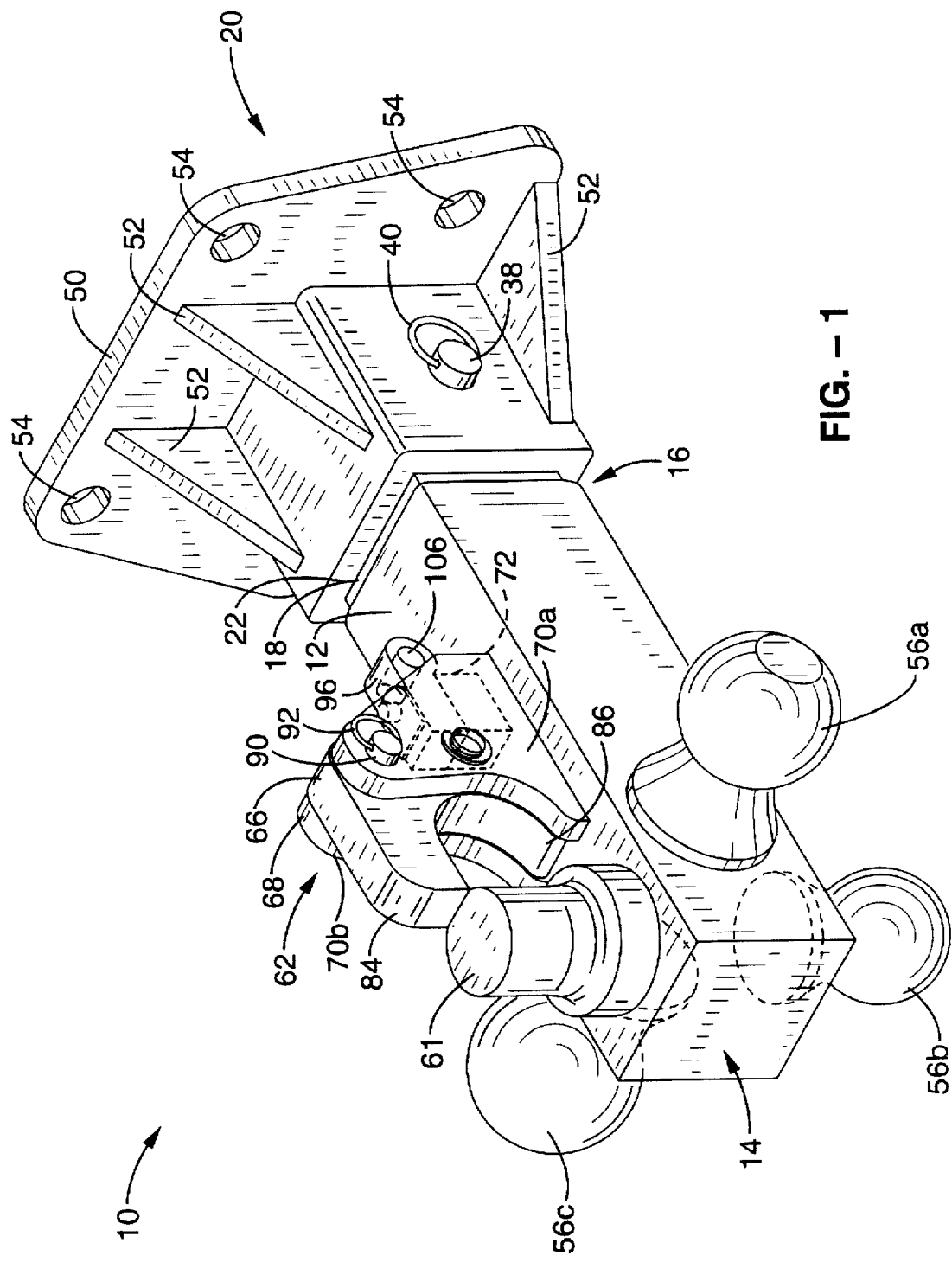
FIG. 1 is a perspective view of a tow hitch apparatus in accordance with the present invention.
Figure 2:
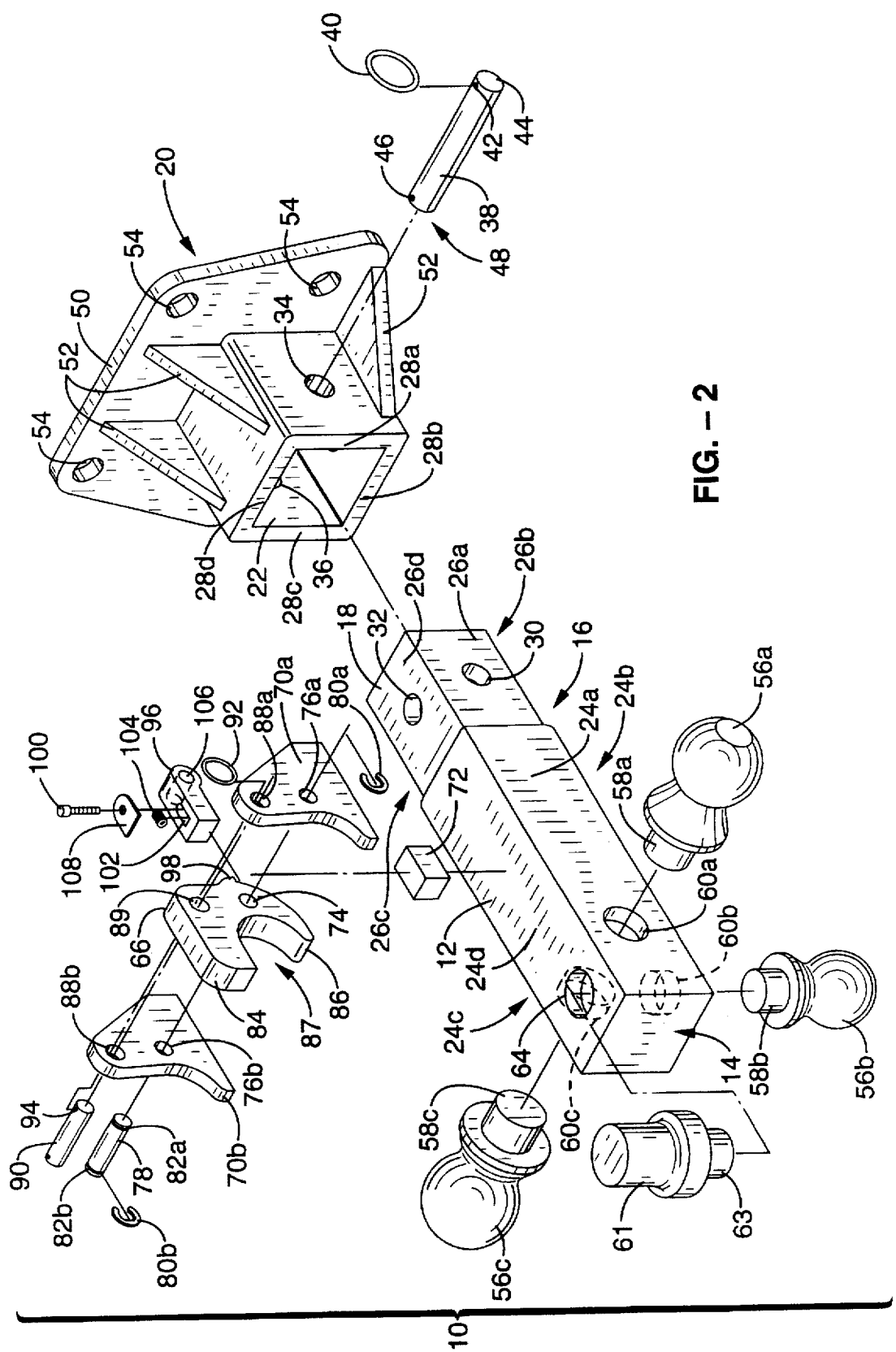
FIG. 2 is an exploded view of the tow hitch apparatus of FIG. 1.

Referring more specifically to the drawings, for illustrative purposes the present invention is embodied in the apparatus generally shown in FIG. 1 through FIG. 10. It will be appreciated that the apparatus may vary as to configuration and as to details of the parts without departing from the basic concepts as disclosed herein.

Referring first to FIG. 1 through FIG. 4, a tow hitch apparatus 10 in accordance with the present invention is generally shown. The apparatus 10 includes a shank 12 with a first end 14 and a second end 16. A tongue 18 is joined to shank 12 at second end 16. A receiver member 20 is provided that includes a receiver 22 which is structured and configured to slidably receive tongue 18. Shank 12 and tongue 18 preferably are integral portions of a single piece made of high strength steel or other metal or metal alloy. Preferably, shank 12 is of generally square cross-section and includes four side faces 24a, 24b, 24c, 24d. Tongue 18 also preferably has a square cross-section and has four faces 26a, 26b, 26c, 26d. Receiver 22 is square in shape to accommodate tongue 18, and includes four sides 28a, 28b, 28c, 28d.

Means for releasably locking tongue 18 into receiver 22 are included with the invention, and preferably comprise a bore 30 which extends laterally through tongue 18 between first and third faces 26a, 26c, and a bore 32 which extends laterally through tongue 18 between second and fourth faces 26b, 26d. Bores 30, 32 are perpendicular or oriented at a right angle relative to each other, and preferably intersect at a point (not shown) within the interior of tongue 18. Holes 34, 36 are provided in first and third sides 28a, 28b respectively of receiver 22. When tongue 18 is inserted into receiver 22, holes 34, 36 in receiver 22 will align with bore 30 or 32, depending upon the orientation of tongue 18. As shown, receiver 22 and tongue 18 are positioned so that holes 34, 36 align with bore 30 when tongue 18 is engaged within receiver 22. A locking or securing pin 38 fits through holes 34, 36 and bore 30 aligned therewith. Pin 38 preferably includes a ring 40 held within bore 42 adjacent head 44 to aid in withdrawing pin 38 from holes 34, 36 and bore 30. A chain or lanyard (not shown) may be attached to ring to facilitate handling of pin 38. A bore 46 adjacent the end 48 of pin 38 receives the latch of a padlock (not shown) to prevent removal of pin 38 from holes 34, 36 and bore 30. End 48 of pin 38 may be tapered to facilitate insertion of pin 38 into holes 34, 36 and bore 30. Pin 38 may additionally include a spring loaded stud (not shown) adjacent end 48 to prevent pin 38 from inadvertently slipping out of holes 34, 36 and bore 30 or 32.

Receiver member 20 includes means for coupling to a towing vehicle which preferably comprise a back plate 50 which is joined to receiver 22. A plurality of triangular plates or gussets 52 on receiver member 22 connect receiver 22 and back plate 50 and provide reinforcement thereto. A plurality of apertures 54 on back plate 50 allow back plate 50 to be bolted to a towing vehicle (not shown).

A plurality of tow balls 56a, 56b, 56c are joined to shank 12 adjacent first end 14. Tow balls 56a, 56b, 56c are differently sized to allow the tow hitch apparatus 10 to mate with differently sized couplers, as discussed further below. Preferably, tow ball 56a is coupled to face 24a, tow ball 56b is coupled to face 24b, and tow ball 56c is coupled to face 24c on shank 12. Tow ball 56a includes a base 24a which is fits into a matching opening 60a on face 20a of shank 12. Tow ball 56b similarly has a base 58b which is accommodated by opening 60b on face 24b, and a base 58c on tow ball 56c fits into opening 60c on face 24c of shank 12. Bases 58a, 58b, 58c are welded into corresponding openings 60a, 60b, 60c so that tow balls 56a, 56b, 56c are integral to shank 12 and tongue 18. The size and number of tow balls 56a, 56b, 56c may be varied with the invention for different towing requirements.

At least one non-tow ball hitch means for engaging, attaching or joining to a coupler on a towed vehicle, trailer or the like is included on shank 12, to allow use of the tow hitch apparatus 10 with couplers which are not designed to accommodate tow balls. The term "coupler" as used herein encompasses all types of coupling devices and hardware provided on a trailer or trailing vehicle which can mate with, engage, receive or couple to the hitch means included on shank 12. For example, couplers for tow balls 56a, 56b, 56c generally comprise corresponding socket members (not shown) which would receive tow balls 56a, 56b, 56c within matching sockets.

As shown in FIG. 1 through FIG. 4, the non-tow ball hitch means comprises a pintle 61 and latch assembly 62 which are structured and configured to couple to a conventional trailer ring coupler, ringed receiver or "Lunette eye" (not shown), with pintle 61 fitting within the center of the Lunette eye. Pintle 61 and latch assembly 62 are joined to face 24d of shank 12. Pintle 61 includes a base 63 which is mounted within opening 64 on face 24d adjacent first end 14 of shank 12, and preferably held therein by welding. Latch assembly 62 includes a latch member 66 which is pivotally mounted on a latch block 68. Latch block 68 comprises a pair of brackets 70a, 70b which are joined to a base 72. Preferably, base 72 and brackets 70a, 70b are integral portions of a single piece of steel comprising latch block 68, with latch block 68 joined to shank 12 on face 20d by welding. Latch member 66 includes a bore 74, and brackets 70a, 70b of latch block 68 include bores 76a, 76b respectively. A pivot pin 78 fits through bores 74, 76a, 76b to pivotally fasten latch member 66 to latch block 68. Pivot pin 78 is held within bores 74, 76a, 76b by a pair of "e" clips 80a, 80b which are received by lateral grooves 82a, 82b adjacent the ends of pivot pin 78.

Figure 4:
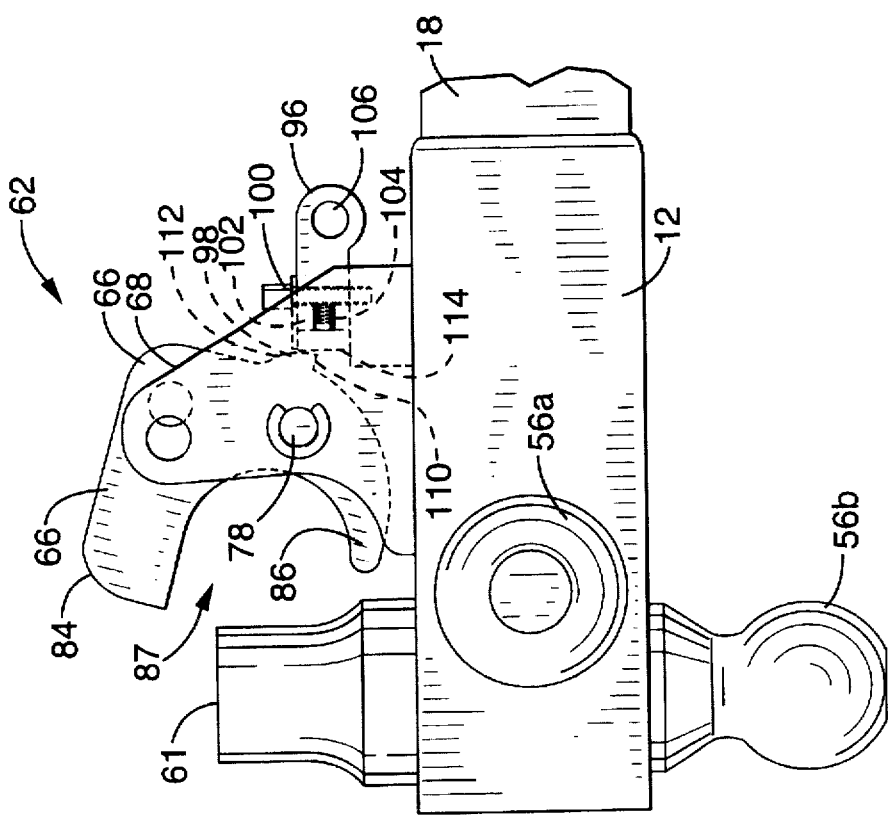
FIG. 4 is a fragmentary side elevation view of the apparatus of FIG. 1 showing a latch and pintle assembly with the latch in an open position.

Latch member 66 includes an upper locking arm 84 and a lower, curved tongue or hook 86 below arm 84, with a generally arcuate opening 87 defined therebetween, and with opening 87 structured and configured to accommodate a Lunette eye or ring coupler (not shown). Latch member 66 pivots on latch block 68 between a first, closed position, shown in FIG. 3, and a second, open position which is shown in FIG. 4. Latch assembly 62 is positioned on first face 20a of shank 12 such that locking arm 84 is adjacent to or contacts pintle 61 when latch member 66 is in the closed position, and so that locking arm 84 is away or removed from pintle 61 when latch member 66 is in the open position.

A pair of aligned bores 88a, 88b are provided in brackets 70a, 70b respectively and a bore 89 is included in latch member 66. Bores 89, 88a, 88b are aligned or co-linear when latch member 66 is in the closed position. A securing pin 90 which fits through bores 89, 88a, 88b when bores 89, 88a, 88b are aligned. A ring 92 is attached to pin 90 through a lateral bore 94 in pin 90. Ring 92 may be grasped by a user to facilitate removal of pin 90 from bores 89, 88a, 88b. A spring loaded stud (not shown) is also preferably included on pin 90 to prevent pin 90 from inadvertently slipping out of bores 89, 88a, 88b.

Means for automatically and releasably locking latch member 66 in the closed position are included with the invention, and preferably comprises a latch pawl 96 slidably mounted in latch block 68 and a corresponding tooth or ratchet 98 on latch member 66. Latch pawl 96 is slidably mounted onto base 72 between brackets 70a, 70b of latch block 68 by a bolt 100 which extends through a slot or well 102 in latch pawl 96 and into base 72. Latch pawl 96 slides in a generally horizontal manner. Bolt 100 slides within slot 102 as latch pawl 96 slidably moves, with the length of slot 102 defining the range of sliding motion of latch pawl 96. A spring 104 is included in slot 102 adjacent bolt 100 and provides a bias to latch pawl 96 in the direction of latch member 66. A bore 106 is provided in latch pawl 96 to accommodate a ring (not shown) which may be grasped by a user. A "D" plate 108 is held over the top of slot 102 by bolt 100 to prevent spring 104 from escaping from slot 102. The spring loaded latch pawl 96 and ratchet 98 of the invention provide an automatic locking function which prevents a Lunette eye coupler from disengaging pintle 61, as described more fully below.

Figure 3:
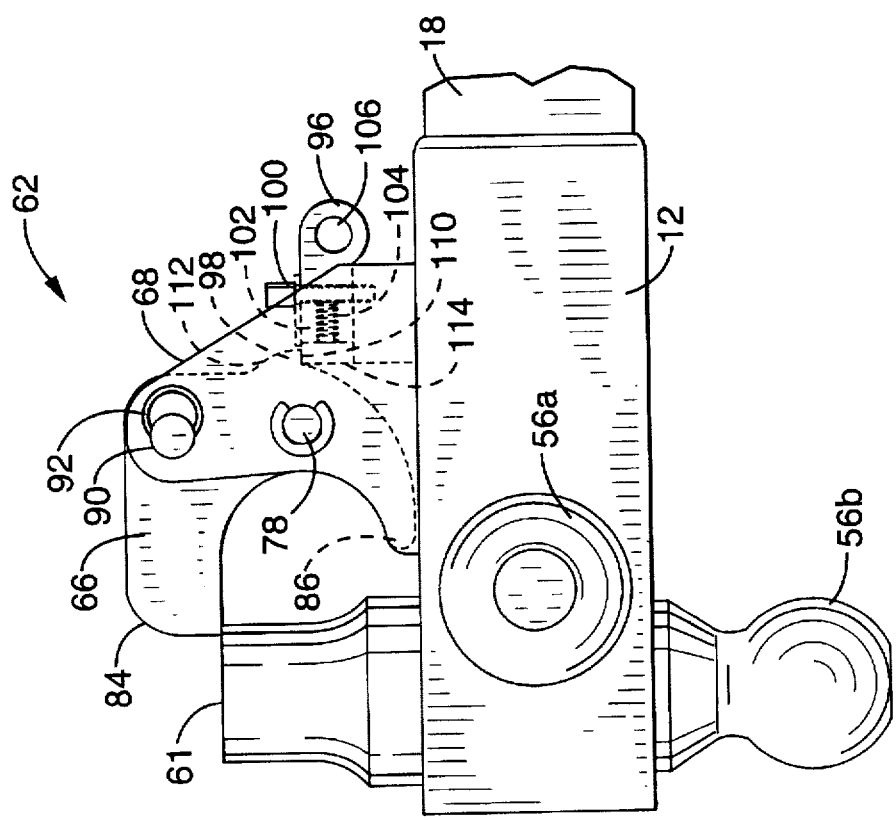
FIG. 3 is a fragmentary side elevation view of the apparatus of FIG. 1 showing a latch and pintle assembly with the latch in a closed position.

Referring more particularly to FIG. 3 and FIG. 4, latch pawl 96 slidably moves between a forward position shown in FIG. 3 and a back or withdrawn position shown in FIG. 4. Ratchet 98 includes a generally flat side 110 and a generally curved side or camming surface 112. Latch pawl 96 preferably has a square front end 114. When latch member 66 is in the closed position and latch pawl 96 is in the forward position as shown in FIG. 3, end 114 of latch pawl 96 is held under ratchet 98 adjacent flat side 110 of ratchet 98. The bias provided by spring 104 applies a force to latch pawl 96 in the direction of the forward position, so that end 114 of latch pawl 96 automatically slips under ratchet 98 and adjacent flat side 110 when latch member 66 is in the closed position, unless a counteracting force is applied to latch pawl 96 by a user to overcome the bias of spring 104.

While end 114 of latch pawl 96 is beneath ratchet 98 and adjacent the flat side 110 thereof, latch member 66 is locked in the closed position, even if pin 90 has been withdrawn from bores 89, 88a, 88b, since the presence of the end 114 of latch pawl 96 beneath ratchet 98 prevents pivoting of latch 66 on pivot pin 78. When a force is applied to latch pawl 96 to overcome the bias of spring 104, latch pawl 96 moves toward the back position, and end 114 is moved away from or withdrawn from ratchet 98, allowing latch member 66 to pivotally move to the open position as shown in FIG. 4. While in the open position, the bias of spring 104 holds end 114 of latch pawl 96 above ratchet 98 and against the curved side or camming surface 112 on ratchet 98. Camming surface 112 prevents ratchet 98 and latch pawl 96 from locking latch member 66 in the open position, and latch member 66 can be returned to the closed position by merely pushing down on arm 84 of lock member. When a Lunette eye or trailer ring coupler (not shown) is fitted over pintle 61, the Lunette eye enters arcuate opening 87, and the weight of the Lunette eye coupler presses down on or provides a vertical force onto tongue 86. As the weight of the Lunette eye coupler presses down on tongue 86, latch member 66 moves towards the closed position, and end 114 of latch pawl 96 slips along camming surface 112 until end 114 clears or moves past ratchet 98, at which point the bias provided by spring 104 moves or "snaps" latch pawl 96 forward and under ratchet 98 adjacent flat side 110. Thus, when latch member 66 is moved to the closed position under the weight of the Lunette eye coupler, latch pawl 96 automatically moves forward under the action of spring 104 and locks latch member 66 in the closed position to lock the Lunette eye coupler onto pintle 61, with arm 84 of latch member 66 positioned over the Lunette eye coupler. The latch and pintle assembly 62 of the invention thus provides for automatic locking of a Lunette eye coupler onto pintle 61 when the Lunette eye coupler is placed over pintle 61. Securing pin 90 and bores 88a, 88b 89 serve as a backup locking or securing mechanism, in addition to the automatic locking means provided by spring loaded latch pawl 96 and ratchet 98, to prevent a Lunette eye coupler from disengaging from pintle 61. However, the automatic locking means of the invention will prevent a Lunette ring coupler from disengaging pintle 61 even when the user of the invention has failed to use securing pin 90 to lock latch member 66 in the closed position.

The tow hitch apparatus 10 comprising the invention is used by attaching back plate 50 of receiver member 20 to a towing vehicle by bolts (not shown) through holes 54, by welding, or by other standard attachment means. The user of the invention selects a desired tow hitch means, i.e., one of tow balls 56a, 56b, 56c or pintle 61 and latch assembly 62. The shank 12 and attached tongue 18 are rotated or otherwise oriented such that the desired hitch means is located on top of shank 12 while shank 12 and tongue are in a generally horizontal position. For example, in order to use the pintle 61 and latch assembly 62 for engaging a trailer ring coupler or Lunette eye (not shown), face 24d on shank 12 is positioned to face upward so that pintle 61 and latch assembly 62 are generally located on top of shank 12. Tongue 18 is then inserted into receiver 22, with face 26d of tongue adjacent to side 28d of receiver 22 in order to preserve the desired orientation of shank 12, pintle 61 and latch assembly 62. Tongue 18 is positioned within receiver 22 so that holes 34, 36 in sides 28a, 28c of receiver 22 are aligned with bore 30 in tongue 18, and securing pin 38 is inserted into hole 34 and through bore 30 and hole 36 until head 44 on pin 38 is adjacent side 28a of receiver 22. The spring loaded stud (not shown) on pin 38 holds pin within bore 30 and holes 34, 36 by snap fitting to prevent pin from inadvertently slipping out of bore 30 and holes 34, 36. Preferably, the latch of a padlock (not shown) is inserted through bore 46 at end 48 of pin 38 and locked therethrough to prevent pin 38 from being withdrawn from bore 30 and holes 34, 36, and thus prevent tongue 18 from disengaging receiver 22. The use of a padlock with bore 46 in pin 38 additionally prevents theft of the apparatus from a vehicle. Ring 40 on pin 38 can be grasped by a user to disengage pin 38 from holes 34, 36 and bore 30 to allow removal of tongue 18 from receiver 22.

The apparatus 10 is mated with or coupled to a Lunette eye or trailer ring coupler (not shown) on a trailer vehicle by moving latch member 66 to the open position shown in FIG. 4. As described above, the user applies a force to latch pawl 96 to overcome the bias of spring 104 and withdraw or move latch pawl 96 to the back position, shown in FIG. 4, so that ratchet 98 clears the end 114 of latch pawl 96 allowing latch member 66 to move to the open position. While in the open position, the Lunette eye coupler is placed over pintle 61, with arcuate opening 87 between arm 84 and hook 86 on latch member 66 accommodating the edge of the Lunette eye, and with pintle 61 fitting within the center of the Lunette eye coupler. When the Lunette eye coupler is thus in place, the weight of the Lunette eye coupler exerts a downward force against nose 86 of latch member, causing latch member 66 to move to the closed position. As latch member 66 returns to the closed position, latch pawl 96 moves under ratchet 98 and automatically locks latch member 66 in the closed position, with arm 84 positioned over the Lunette eye coupler to prevent the Lunette eye coupler from being unhitched or removed from pintle 61. Securing pin 90 is preferably inserted through holes 88a, 88b in brackets 70a, 70b and bore 89 in latch member 66 to further lock latch member 66 in the closed position and ensure that the Lunette eye coupler does not disengage from pintle 61. However, the automatic locking means provided by the spring loaded latch pawl 96 and ratchet 98 of the invention provide an auto-lock function and serve to hold or lock the Lunette ring coupler onto pintle 61 even if the user of the invention inadvertently forgets or otherwise fails to insert securing pin 90 through bores 88a, 88b, 89.

Note that tow balls 56a, 56c are offset from pintle 61 or set back from first end 14 of shank 12 relative to pintle 61, so that the trailer ring may pivot on pintle 61 as the towing vehicle and trailer make turns without the trailer ring bumping into tow balls 56a, 56c.

When the user of the invention subsequently wishes to use the tow hitch apparatus 10 with a trailer having a coupler or receiver for tow ball 56a, 56b or 56c rather than a Lunette eye coupler, pin 90 is withdrawn from holes 88a, 88b and bore 89, latch pawl 96 is pulled back, and latch member 66 is moved to the open position so that the Lunette eye coupler can be disengaged from pintle 61. Securing pin 38 is then withdrawn from holes 34, 36 and bore 30, tongue 18 is disengaged from receiver 22, and shank 12 is suitably oriented so that the desired tow ball 56a, 56b or 56c is oriented upward. Then, tongue 18 is re-engaged in receiver 22 and secured therein with pin 38 as described above, and a coupler or receiver is engaged with the upwardly oriented tow ball 56a, 56b or 56c in a standard fashion. The apparatus 10 thus allows towing of trailer vehicles with different sized tow ball couplers or a trailer ring or Lunette eye coupler.

Receiver member 20, shank 12 and tongue 18, and the tow hitch means joined to shank 12 are all preferably made of high strength steel or other metal alloy to withstand the stresses generated during towing a trailer by a vehicle. Securing pins 38, 90 likewise are made of high strength steel or other metal alloy designed to withstand substantial loads. The structure, configuration and relative thickness of shank 12, tongue 18 and receiver member 20 may be varied as required or made of varying materials to meet different load requirements or towing needs. While shank 12 is shown with four tow hitch means included thereon (the three tow balls 56a, 56b, 56c and pintle 61 and latch assembly 62), a smaller number of hitch means may be provided on shank 12 if desired.

Tongue 18 and receiver 22 are preferably of square structure and configuration as shown to minimize torsional stresses on securing pin 38. Previously designed tow hitch devices which have used a cylindrical tongue and receiver or socket arrangement have proved deficient in that the securing pin holding the tongue within the receiver is subject to shearing because the cylindrical or round shape of the tongue and receiver is conducive to unwanted rotational motion during towing procedures. The square receiver 22 and square tongue 18 of the present invention eliminate this problem by making such rotational motion impossible.

Figure 5:
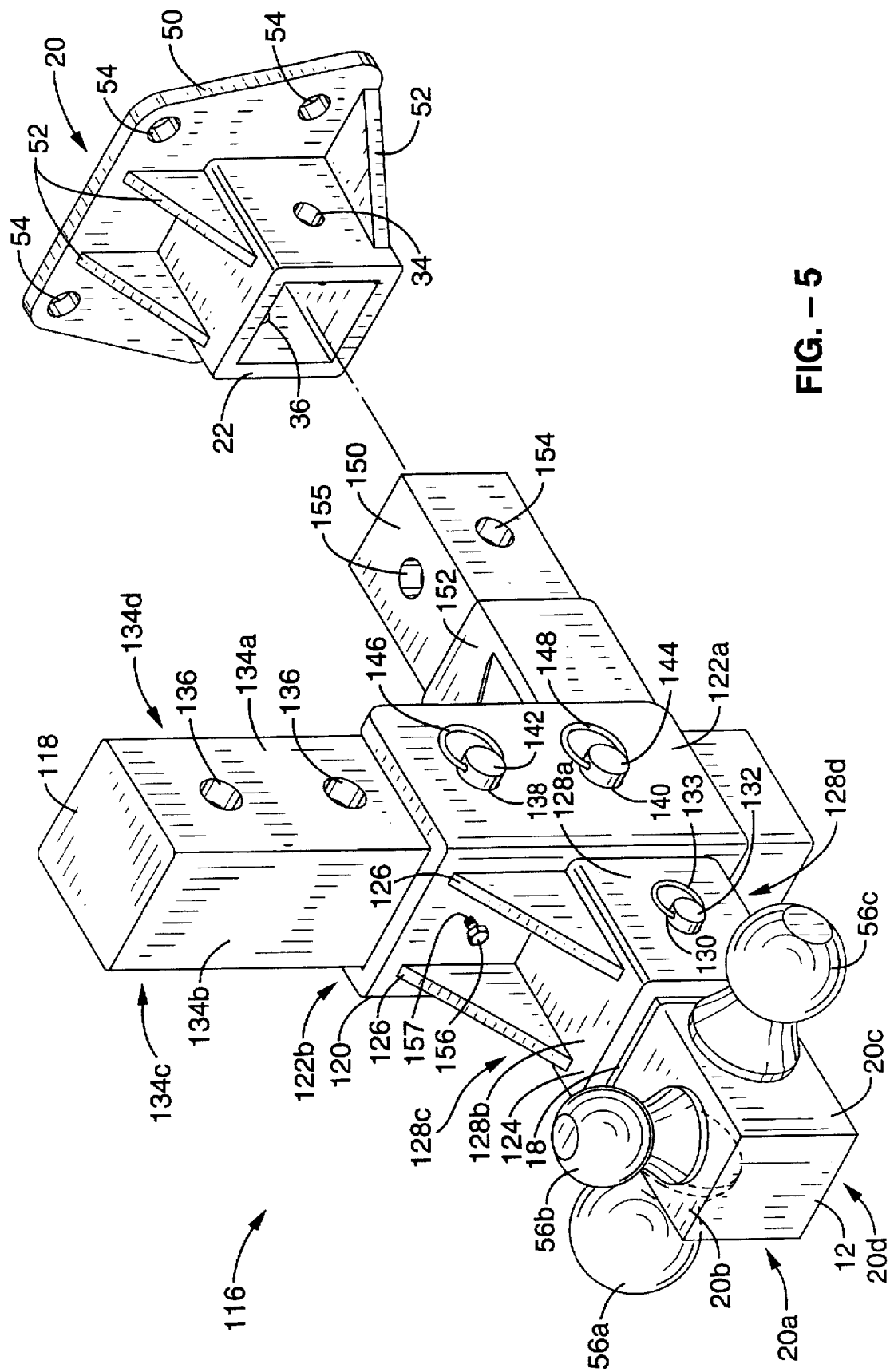
FIG. 5 is a perspective view of a second embodiment of a tow hitch apparatus in accordance with the present invention wherein a vertical adjustment sleeve and bar is provided and showing the tongue and receiver member exploded.

Referring now to FIG. 5, there is shown a second embodiment tow hitch apparatus 116 in accordance with the present invention, wherein like reference numerals denote like parts. Shank 12 is shown rotated one hundred and eighty degrees relative to the orientation of shank 12 in FIG. 1 through FIG. 4, and pintle 61 and latch assembly 62 have been omitted from shank 12 in FIG. 5 for clarity. The apparatus 116 includes means for adjusting the vertical position of shank 12 and the tow hitch means thereon. The vertical adjustment means preferably comprises a vertical bar 118 and a sleeve member 120 which is slidably positioned on vertical bar 118. Sleeve member 120 includes a pair of vertical plates 122a, 122b which are joined to a receiver 124 and reinforced by gussets 126. Receiver 124 is of square shape with sides 128a, 128b, 128c, 128d, and is structured and configured to receive tongue 18. Receiver 124 includes an opening 130 in side 128a and a matching opening (not shown) in side 128c which is aligned with opening 130. The openings in sides 128a, 128c of receiver 124 accommodate a securing pin 132. Securing pin 132 engages the openings in faces 128a, 128c and a bore (not shown) in tongue 18 and snap fit thereinto by a spring loaded stud (not shown) to secure tongue 18 within receiver 124 in the same manner as described above for receiver 22 and pin 38 of the apparatus 10. Pin 132 includes a ring 133 to facilitate handling by a user.

Vertical bar 118 is preferably of square cross-sectional shape and includes faces 134a, 134b, 134c, 134d. A plurality of generally horizontal bores 136 extend through vertical bar 118 between faces 134a, 134b. Vertical plates 122a, 122b are spaced apart at a distance such that vertical bar 118 is slidably accommodated therebetween. Vertical plate 122a on sleeve member 120 includes a pair of openings 138, 140 which are vertically spaced apart in plate 122a by the same distance as the vertical spacing of bores 136 in vertical bar 118. Vertical plate 122b contains a pair of openings (not shown) which match or correspond to openings 138, 140 on vertical plate 122a. A pair of securing pins 142, 144 are provided which slidably engage the openings in vertical plates 122a, 122b and a pair of bores 136 in vertical bar 118 which are aligned with the openings in plates 122a, 122b. Rings 146, 148 on pins 142, 144 facilitate removal of pins 142, 144, and spring loaded studs (not shown) are included on pins 142, 144 to prevent pins 142, 144 from slipping out of bores 136 and the holes in plates 122a, 122b. Securing pins 142, 144 provide means for releasably locking said sleeve member 120 on said vertical bar 118. A pad lock (not shown) may be used to lock through bores (not shown) in the ends of pins 142, 144 in the manner described above to prevent removal of tongue 18 from receiver 124 of sleeve member 120.

Vertical bar 118 may be mounted directly on a towing vehicle (not shown) by welding or the like, or may alternatively include a horizontal tongue 150 of square cross-sectional shape which is structured and configured to engage receiver 22 on receiver member 20 in a manner identical to that described above for tongue 18. Tongue 150 is shown as joined to vertical bar 118 by a brace 152. When bore 154 in tongue 150 is aligned with holes 34, 36 in receiver 22, tongue 150 can then be locked into receiver 22 by a securing pin (not shown) in the manner described above.

The apparatus 116 is used by engaging tongue 150 into receiver 22 on receiver member 20 and securing tongue 150 within receiver 124 by inserting a securing pin (not shown) through holes 34, 36 in receiver 22 and bore 154 in tongue 150. A desired vertical position is selected for sleeve member 120, and sleeve member 120 is slidably moved on vertical bar 118 to the chosen position. Holes 138, 140 in vertical plate 122a, and the matching holes (not shown) in vertical plate 122b are aligned with the appropriate bores 136 in vertical bar, and pins 142, 144 are inserted therethrough. Tongue 18 is then secured within receiver 124 by pin 132 in the above-described manner to place the shank 12 at the chosen vertical position according to the location of sleeve member 120 on vertical bar 118. The apparatus 116 is otherwise used in a manner similar to that described above for the apparatus 10. Note that padlocks (not shown) may be used in association with pins 142, 144 to prevent removal of sleeve member 120 from bar 118 by inserting the latch of a padlock through a bore (not shown) in the end of pin 142 and/or 144.

The vertical positioning provided by the apparatus 116 is desirable in cases where the coupler on the trailer vehicle is not properly positioned vertically relative to the towing vehicle for effective towing. Optimum vertical alignment of tow hitch assemblies is particularly important when towing multi-axle trailers, since level towing is required to achieve equal load sharing per axle of the multi-axle trailer. Sleeve member 120 and vertical bar 118 allow tow ball 56a, 56b or 56c, or pintle 61 and latch assembly 62, to be adjusted in vertical position to accommodate the vertical position of the coupler on the trailer. Preferably, means for preventing vibration of sleeve member 120 on vertical bar 118 during road travel are included with the apparatus 116, with the vibration preventing means comprising an anti-vibration bolt 156 which threads through bore 157 to engage vertical bar 118. The user can tighten bolt 156 for travel over uneven road surfaces which would otherwise cause unwanted vibration of sleeve member 120 on bar 118.

Note that tongue 150 also includes a bore 155 which is generally perpendicular to bore 154, and when tongue 150 is engaged within receiver 22 with bore 155 aligned with holes 34, 36, bar 118 will be horizontal rather than vertical, and the apparatus 116 may be used to horizontally position shank 12 and the tow hitch means thereon. While it will generally be preferably to have shank 12 and the tow hitch means thereon centrally located on the rear of the towing vehicle, there may occasionally be situations where horizontal positional adjustment of shank 12 is desirable.

Figure 6:
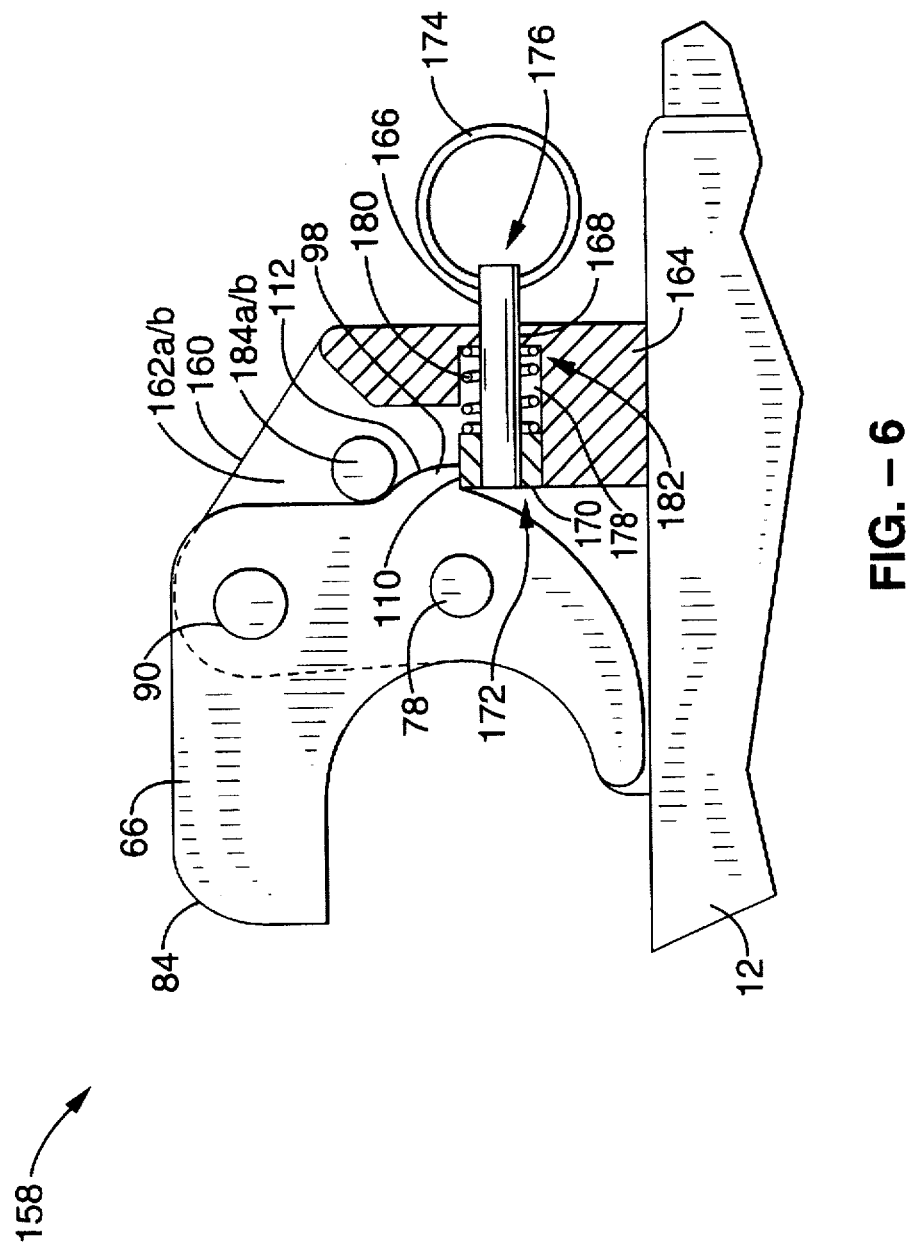
FIG. 6 is a side elevation view of a second embodiment of the latch assembly of the present invention.

Referring now to FIG. 6, a second embodiment latch assembly 158 in accordance with the present invention is generally shown, wherein like reference numbers denote like parts. A latch member 66 is pivotally mounted in a latch block 160 comprising a pair of brackets 162a, 162b and a base 164. Latch member 66 is shown in a closed position, and a pintle (not shown) is adjacent to arm 84 of latch member 66 as described above. Preferably, base 164 and brackets 162a, 162b are integral portions of a single piece of steel comprising latch block 160 which is welded to shank 12. Means for automatically locking latch member 66 in the closed position are provided in the form of a latch pin 166 which is slidably mounted in base 164 between brackets 162a, 162b through bore 168. A generally square or "U"-shaped slide block 170 is included on a first end 172 of latch pin 166 and a pull ring 174 is included on a second end 176 of latch pin 166. A slide chamber 178 in base 164 accommodates slide block 170, and bore 168 communicates with chamber 178. Bias means for pushing on slide block 170 are included within chamber 178 in the form of spring 180. Spring is positioned between slide block 170 and a back wall 182 of chamber 178, and latch pin 166 extends generally through the center or coil of spring 180.

Latch pin 166 slidably moves within bore 168 between a forward position, as shown in FIG. 6, and a back position (not shown). Slide block 170, which is joined to end 172 of latch pin 166, slidably moves within chamber 178 as pin is moved between the forward and back positions. Spring 180 provides a bias to latch pin 166 and slide block 170 so that latch pin 166 and slide block 170 will automatically return towards the forward position unless a user provides a counteracting force by pulling on ring 174. Slide block 170 is structured and configured to act as a catch or pawl for ratchet 98 on latch member 66, and slide block 170 fits beneath ratchet 98 and adjacent flat surface 110 of ratchet when slide member 170 and latch pin 166 are in the forward position.

In order to move latch member 66 to the open position (not shown) as described above, the user pulls on ring 174 to overcome the bias of spring 180 and slidably move latch pin 166 through bore 168 and slide block 170 through chamber 178 from the forward position to the back position. While in the back position, slide block 170 is clear of or does not block ratchet 98, and latch member 66 can be pivoted on pin 78 to the open position as described above. While in the open position, the bias of spring 180 pushes slide block 170 against curved camming surface 112 on ratchet 98. Since camming surface 112 will not catch on slide block 170, latch member 66 does not lock in the open position and can be closed by merely pushing down on arm 84 as described above until latch member 66 reaches the closed position, at which point the action of spring 180 pushes slide block 170 forward and under ratchet 98 to automatically lock latch member 66 in the closed position.

A securing pin 90 is included which locks through aligned bores (not shown) in latch member 66 and brackets 162a, 162b of latch block 160 in the manner described above. Alternatively, bores 184a, 184b may be provided through brackets 162a, 162b, with pin inserted therethrough to prevent opening of latch member 66. The vertical positioning means described above and shown in FIG. 5 may be used with latch assembly 158 attached to shank 12. In all other respects, latch assembly 158 is used in generally the same manner as related above for latch assembly 62.

Figure 7:
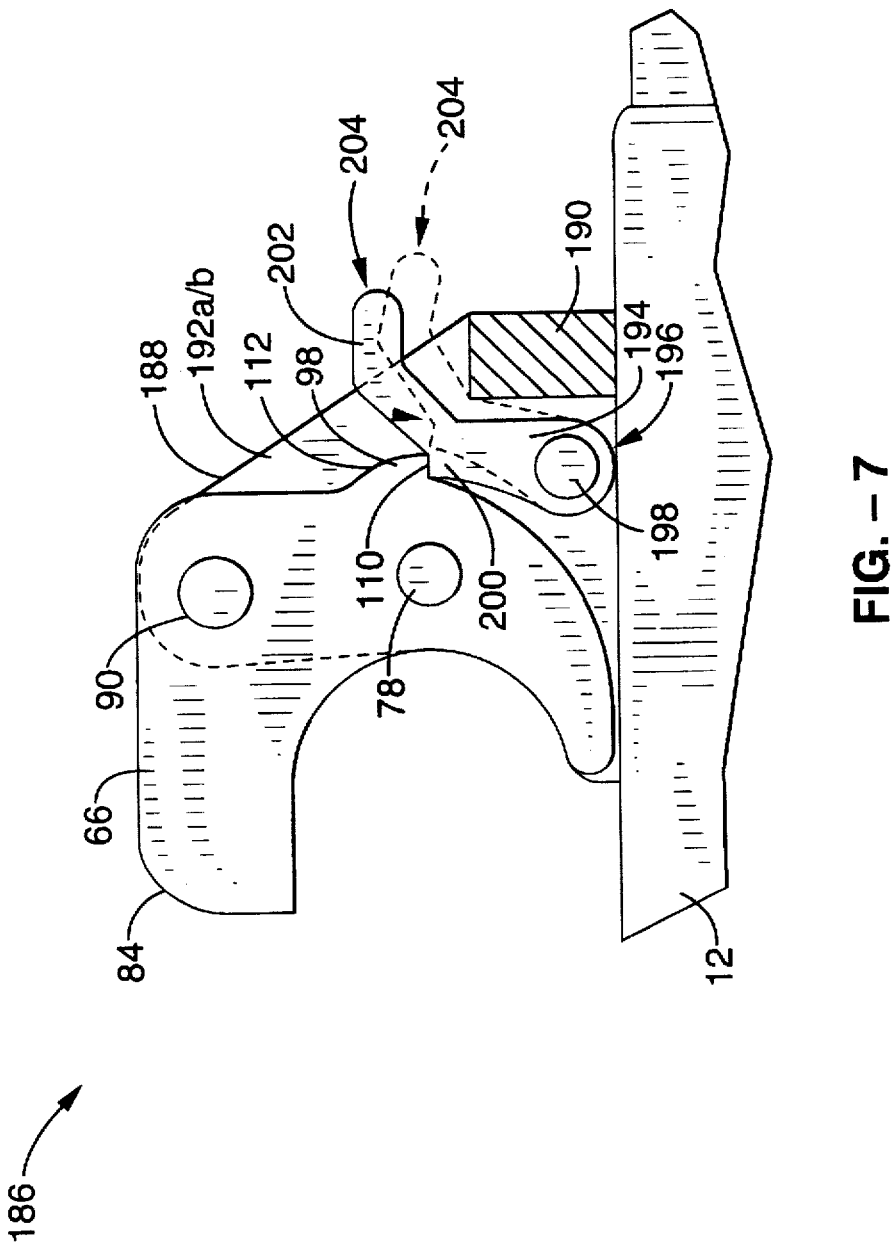
FIG. 7 is a side elevation view of a third embodiment of the latch assembly of the present invention.

Referring now to FIG. 7, a third embodiment latch assembly 186 in accordance with the present invention is generally shown, wherein like reference numbers denote like parts. Latch assembly 186 includes a latch block 188 with a base 190 and a pair of upright brackets 192a, 192b which are joined to shank 12. A latch member 66 is pivotally mounted to latch block 188 between brackets 192a, 192b by pivot pin 78, with latch member 66 shown in the closed position. Means for automatically locking latch member 66 in the closed position are included in the form of a latch pawl 194 which is pivotally mounted at a bottom end 196 to latch block 188 by pivot rod 198. Latch pawl 194 includes a shoulder 200, and a handle 202 at a top end 204.

Latch pawl 194 pivots on rod 198 between a forward or locking position, shown in solid lines, wherein shoulder 200 is adjacent to ratchet 98 and flat surface 110 thereof, and a back or unlocked position, shown in dashed lines, wherein shoulder 200 clears ratchet 98. Bias means in the form of a spring (not shown) are included with latch pawl 194 and pivot rod 198, with the spring providing a bias to latch pawl 194 towards the forward position. By pushing on handle 202, latch pawl 194 is moved from the forward position to the back position, disengaging shoulder 200 from ratchet 98 so that latch member 66 can be moved to the open position as described above. While latch member 66 is in the open position, shoulder 200 of latch pawl 194 is pushed by the spring against camming surface 112, which will not catch on shoulder 200, thus preventing latch member from locking in the open position and allowing latch member 66 to be returned to and locked in the closed position by pushing down on arm 84. The latch assembly 186 is positioned adjacent to a pintle (not shown) and is otherwise used in the same manner as described above for latch assembly 158 and latch assembly 62.

Figure 8:
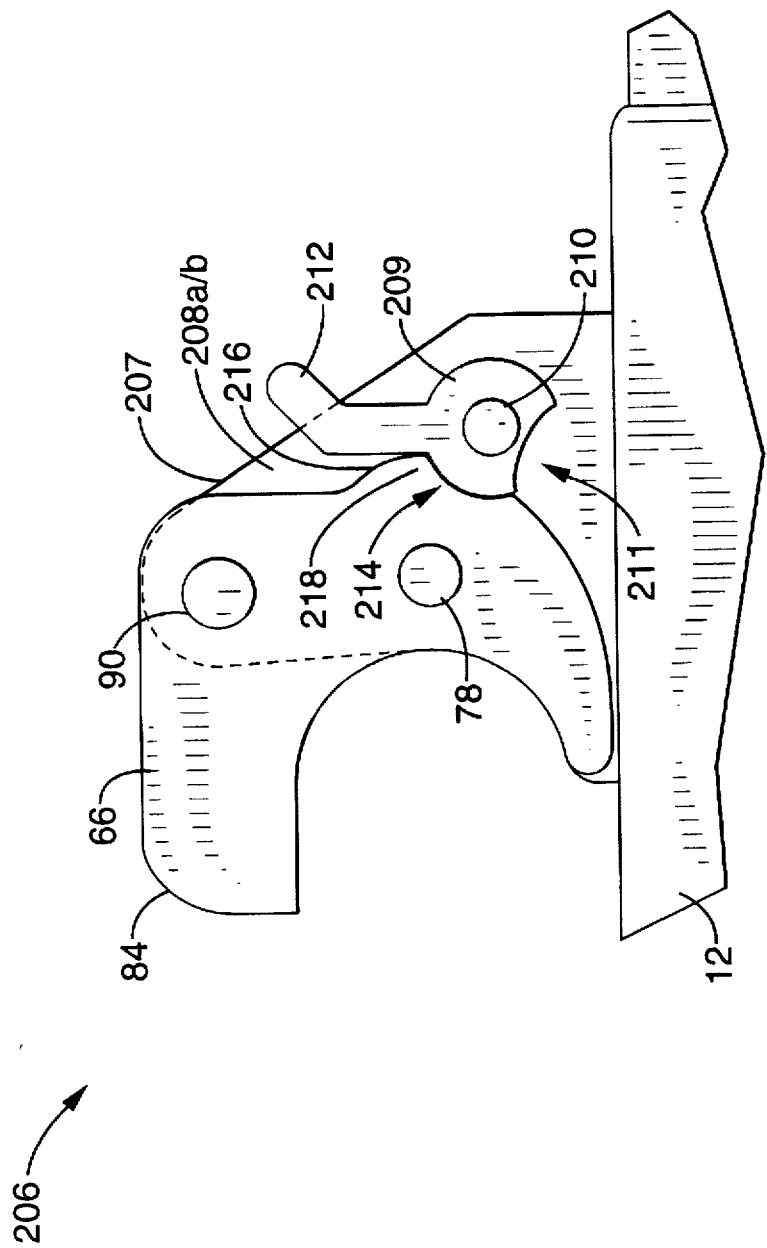
FIG. 8 is a side elevation view of a fourth embodiment of the latch assembly of the present invention.

Referring now to FIG. 8, a fourth embodiment latch assembly 206 in accordance with the present invention is generally shown, wherein like reference numbers denote like parts. A latch member 66, shown in the closed position, is pivotally mounted on a latch block 207 between a pair of brackets 208a, 208b by a pivot pin 78. Automatic locking means are provided in the form of a rolling block 209, which is pivotally or rotatably mounted between brackets 208a, 208b by pivot rod 210. Rolling block 209 is of generally cylindrical shape, and includes an arcuate shaped concavity or cutout 211. A handle or lever 212 is provided on rolling block 209 and positioned generally opposite cutout 211. Latch member 66 includes a generally arcuate concavity or cutout 214 which is contoured to match the circumferential shape of rolling block 209. Latch member 66 includes a cam surface 216, and a tooth or catch 218 is defined on latch member 66 between cam surface 216 and cutout 214.

Rolling block 209 pivots on rod 210 between a locking position, shown in solid lines wherein cutout 211 is facing downward or is otherwise not adjacent latch member 66 and catch 218, and an open position, shown in dashed lines, wherein cutout 211 is positioned adjacent catch 218. A spring (not shown) is included with rolling block 209 and pivot rod 210 to bias rolling block 209 towards the closed position. While in the closed position, rolling block 209 blocks catch 218 and locks latch member 66 in the closed position. While in the open position, cutout 211 in rolling block 209 is positioned to allow catch 218 to clear rolling block 209 so that latch member 66 can be moved to the open position (not shown) as described above. The user moves rolling block 209 by pushing back or down on lever 212 to overcome the bias of the spring and move rolling block 209 to the open position. While latch member 66 is in the open position, cam surface 216 prevents catch 218 from engaging or catching on rolling block 209, thus preventing latch member 66 from locking in the open position. The latch assembly 206 is positioned adjacent to a pintle (not shown) and is otherwise used in the same manner as described above for latch assemblies 186, 158 and 62.

Figure 9:
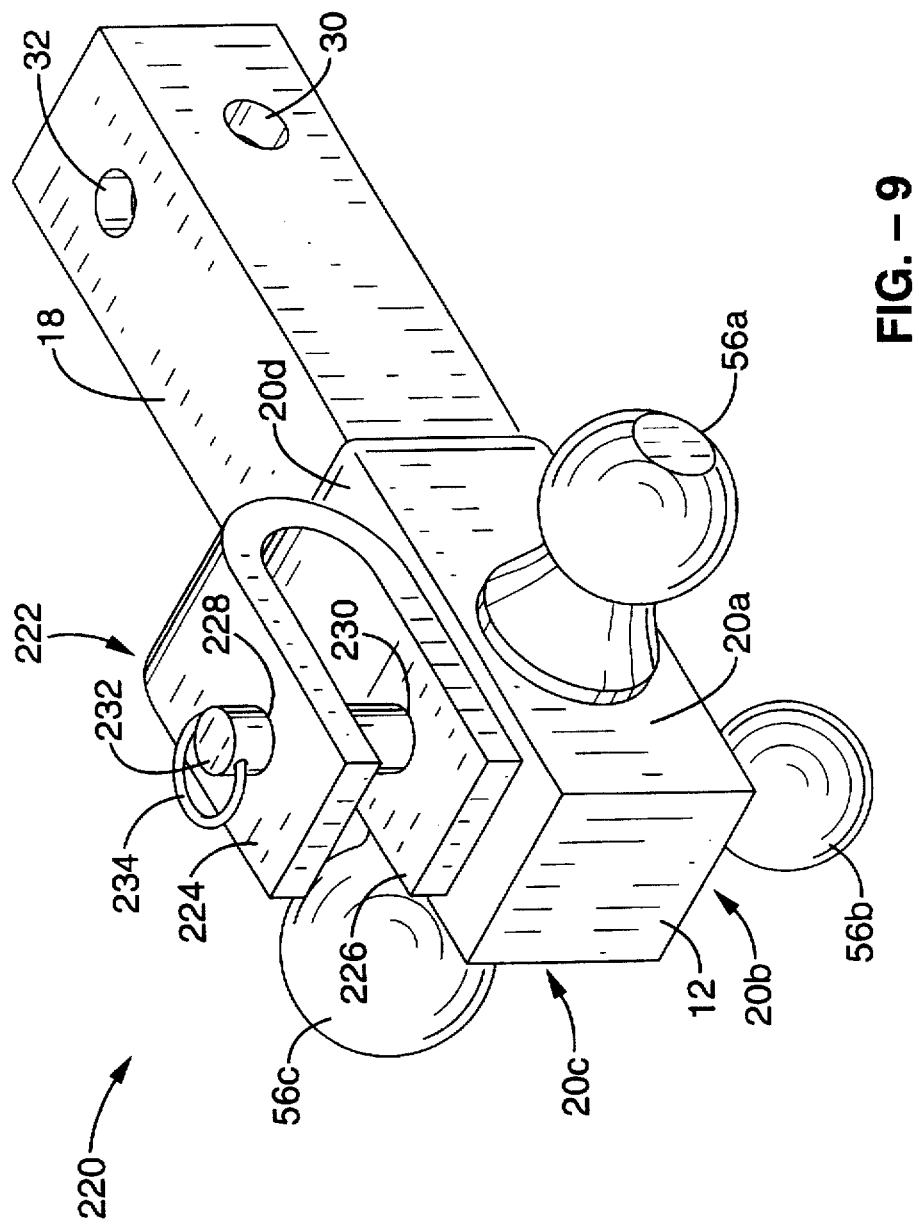
FIG. 9 is a perspective view of a third embodiment of a tow hitch apparatus in accordance with the invention shown with the receiver member omitted.

Referring now to FIG. 9, there is shown a third embodiment of a tow hitch apparatus 220 in accordance with the invention, wherein like reference numerals denote like parts. The apparatus 220 is shown structured and configured to mate with or couple to a conventional wagon tongue coupler (not shown) of the type used on agricultural trailer vehicles. The apparatus 220 includes a shank 12 and tongue 18 and a corresponding receiver member (not shown) which is identical to receiver member 20 described above. The apparatus 220 includes non-tow ball hitch means in the form of a U-shaped member 222 with a top plate 224 and bottom plate 226. U-shaped member 222 is attached to face 24d of shank 12 along bottom plate 226, preferably by welding. Top plate 224 includes an upper bore 228, and bottom plate 226 includes a matching or corresponding lower bore 230, with upper and lower bores 228, 230 being vertically aligned or co-linear along a vertical axis. Lower bore 230 preferably extends into shank 12. A securing pin 232 with a ring 234 engages vertically aligned bores 228, 230 in U-shaped member 222.

The apparatus 220 is used in generally the same manner as described above for the first embodiment apparatus 10 except for the U-shaped member 220 comprising the non-tow ball hitch means. In order to use the apparatus 220 with a wagon tongue coupler, shank 12 is oriented so that face 24d faces upward and U-shaped member 222 is located on top of shank 12. Tongue 18 is engaged in the receiver member (not shown) with a securing pin (not shown) as described above. The wagon tongue is fitted between top and bottom plates 224, 226 of U-shaped member 222 and positioned so that the hole in the wagon tongue is aligned with upper and lower bores 228, 230, and then securing pin 232 is dropped through the aligned bores 228, 230 and hole in the wagon tongue to secure the wagon tongue in U-shaped member 222. The vertical adjustment means described with the second embodiment apparatus 116 may be used with the fourth embodiment tow hitch apparatus 220.

Figure 10:
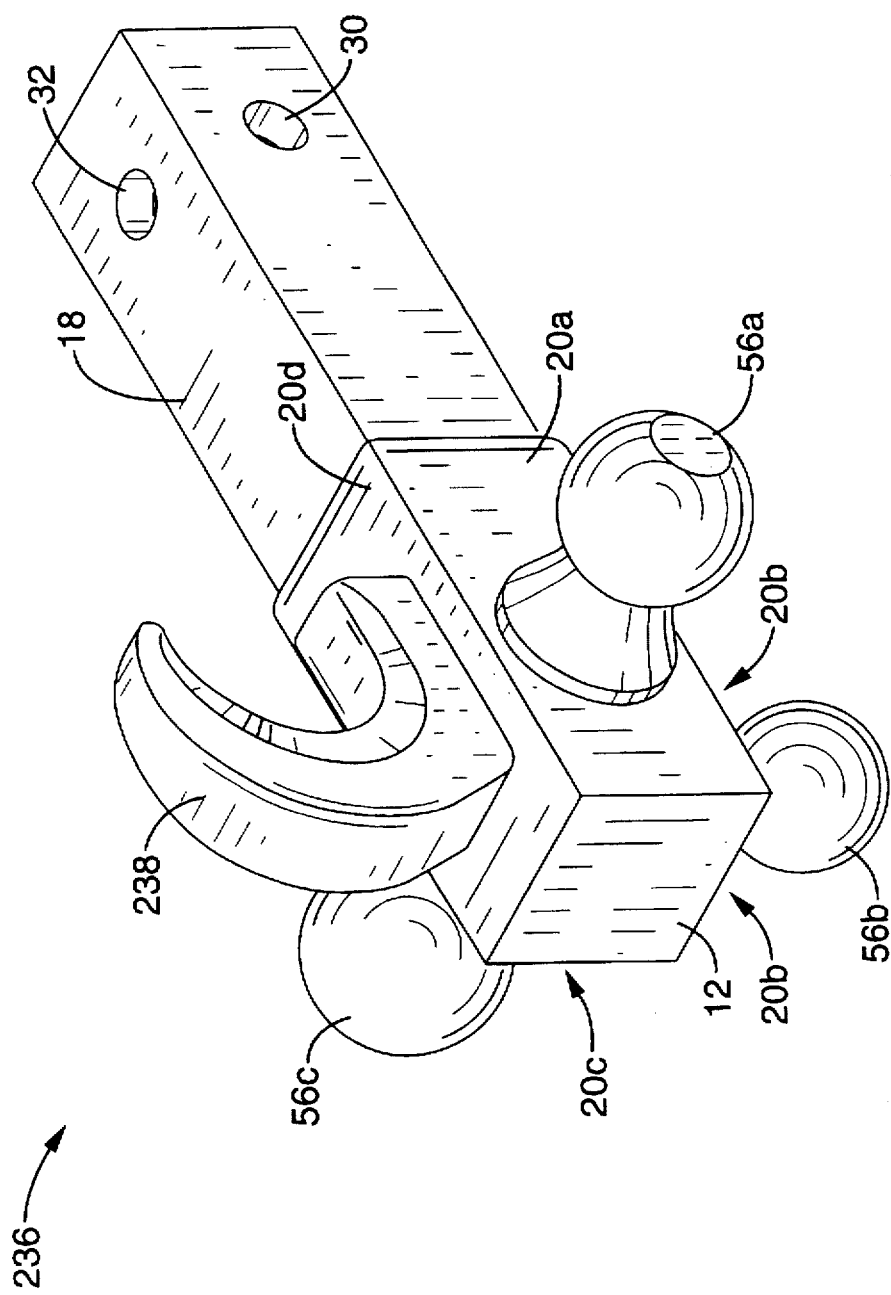
FIG. 10 is a perspective view of a fourth embodiment of the tow hitch apparatus in accordance with the invention shown with the receiver member omitted.

Referring now to FIG. 10, there is shown a fourth embodiment tow hitch apparatus 236 wherein like reference numbers denote like parts. The apparatus 236 includes a towing hook 238 on face 24d of shank 12. Towing hook 238 is structured and configured to couple to a towing chain on a trailer vehicle. The inclusion of towing hook 238 as hitch means eliminates various problems which occur when towing a trailer with a chain. Particularly, it is often difficult to find a suitable feature on the towing vehicle to attach a chain to if a hook is not provided, and make-shift or jury rigged arrangements for attaching a chain to a towing vehicle can damage the towing vehicle. The vertical adjustment means described with the second embodiment apparatus 116 may be used with the fourth embodiment tow hitch apparatus 236 if desired.

The invention may be further modified such that pintle 61 and latch assembly 62 of apparatus 10 are included on shank 12 on one face such as 24d, together with U-shaped member 222 and/or towing hook 238 on another or other face 24a, 24b, 24c. Such an arrangement would allow a single apparatus to hitch to both a trailer ring or a wagon tongue coupler, as well as to a tow ball coupler. Preferably, at least two tow balls and at least one non-tow ball hitch means are included with the invention. The other alternative embodiment latch assemblies 158, 186 and 206 described above may be interchanged with latch assembly 62. In each case, the vertical positioning means shown in FIG. 5 may be utilized.

Accordingly, it will be seen that this invention provides a tow hitch apparatus which provides multiple tow balls and like coupling hardware which can be quickly and easily repositioned to allow towing of vehicles having different tow ball couplers and other, non-tow ball type hitching hardware. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A tow hitch apparatus, comprising:
   (a) a shank, said shank including a plurality of side faces;
   (b) a plurality of different sized tow balls, said tow balls fixedly mounted on said shank;
   (c) a pintle, said pintle fixedly mounted on one said face of said shank;
   (d) a latch block, said latch block fixedly mounted on said face of said shank adjacent said pintle;
   (e) a latch member, said latch member pivotally mounted on said latch block, said latch member pivotally moving between an open position and a closed position; and
   (f) means for automatically locking said latch member in said closed position when a Lunette eye coupler is engaged on said pintle.

2. A tow hitch apparatus as recited in claim 1, further comprising a tongue, said tongue joined to said shank, and a receiver, said receiver structured and configured to receive said tongue.

3. A tow hitch apparatus as recited in claim 2, wherein said tongue has a square cross-section and four outer faces, and said receiver has a square cross-section.

4. A tow hitch apparatus as recited in claim 2, wherein said tongue is releasably retained in said receiver by at least one securing pin, said securing pin fitting into bores extending through said tongue and said receiver.

5. A tow hitch apparatus as recited in claim 2, further comprising:
   (a) a sleeve, said sleeve coupled to said receiver;
   (b) a vertical bar, said sleeve slidably engaging said vertical bar; and
   (c) means for releasably locking said sleeve on said vertical bar.

6. A tow hitch apparatus, comprising:
   (a) a shank, said shank having a square cross-section, said shank including four side faces;
   (b) a tongue, said tongue having a square cross-section, said tongue including four faces, said tongue joined to said shank;

(c) a plurality of different sized tow balls, said tow balls fixedly mounted on said shank;

(d) a pintle and a latch block, said pintle and said latch block fixedly mounted on one said face of said shank, said latch block adjacent said pintle;

(e) a latch member pivotally mounted on said latch block, said latch block including a locking arm, said latch member pivotally moving between an open position wherein said locking arm is adjacent said pintle and closed position wherein said locking arm is removed from said pintle, said latch member including a ratchet; and (f) means for automatically locking said latch member in said close position when a Lunette eye coupler is engaged on said pintle.

7. A tow hitch apparatus as recited in claim 6, further comprising means for vertically positioning said shank and said tongue.

8. A tow hitch apparatus as recited in claim 7, wherein said vertical positioning means comprises:

(a) a sleeve, said sleeve coupled to said receiver;

(b) a vertical bar, said sleeve slidably engaging said vertical bar; and (c) means for releasably locking said sleeve on said vertical bar.

9. A tow hitch apparatus, comprising:

(a) a plurality of tow balls, each said tow ball having a different size;

(b) a latch and pintle assembly, wherein said latch and pintle assembly includes a latch member pivotally mounted on a latch block;

(c) a shank, said shank having a square cross-section, said shank including first, second, third and fourth faces, said latch and pintle assembly fixedly mounted on said first face, one said tow ball fixedly mounted on said second face, another said tow ball fixedly mounted on said third face, a third said tow ball fixedly mounted on said fourth face;

(d) a tongue, said tongue having a square cross-section, said tongue including first, second, third and fourth faces, said tongue joined to said shank;

(e) a receiver member, said receiver member having a receiver of square cross-section, said receiver structured and configured to receive said tongue; and (f) means for releasably locking said tongue in said receiver.

10. A tow hitch apparatus as recited in claim 9, wherein said latch and pintle assembly comprises:

(a) a generally cylindrical pintle, said pintle structured and configured to receive a Lunette eye coupler;

(b) said latch block positioned adjacent to said pintle, said latch block including a pair of parallel braces;

(c) said latch member mounted on said latch block between said pair of braces, said latch member pivotally moving between an open position and a closed position, said latch member including a ratchet, said ratchet having a flat surface and a cam surface; and (d) spring-loaded means for automatically and releasably locking said latch member in said closed position when a Lunette eye coupler is engaged on said pintle.

11. A tow hitch apparatus as recited in claim 10, further comprising means for vertically positioning said shank and said tongue.

12. A tow hitch apparatus as recited in claim 11, wherein said vertical positioning means comprises:

(a) a sleeve, said sleeve coupled to said receiver;

(b) a vertical bar, said sleeve slidably engaging said vertical bar; and (c) means for releasably locking said sleeve on said vertical bar.

* * * * *

UNITED STATES PATENT AND TRADEMARK OFFICE
CERTIFICATE OF CORRECTION

PATENT NO. : 5,725,229
DATED : March 10, 1998
INVENTOR(S) : Wesley I. McWethy

It is certified that error appears in the above-indentified patent and that said Letters Patent is hereby corrected as shown below:

Column 12, line 19, change "pans" to --parts--.

Signed and Sealed this

Twenty-first Day of July, 1998

*Attest:*

BRUCE LEHMAN

*Attesting Officer*      *Commissioner of Patents and Trademarks*